Figure 1:
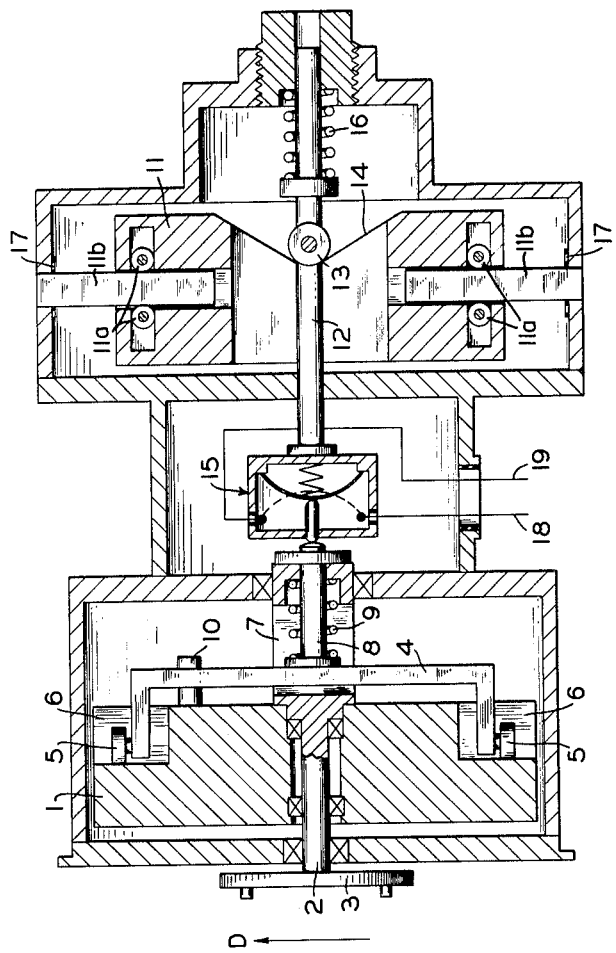

Jan. 4, 1966 E. KEESE 3,227,834
COMBINATION VEHICLE WHEEL SPIN AND WHEEL SLIDE CONTROL SWITCH
Filed Dec. 12, 1961 2 Sheets-Sheet 1

INVENTOR.
ERWIN KEESE
BY
A. A. Steinmiller
ATTORNEY

United States Patent Office 3,227,834
Patented Jan. 4, 1966

3,227,834
COMBINATION VEHICLE WHEEL SPIN AND WHEEL SLIDE CONTROL SWITCH
Erwin Keese, Hannover, Germany, assignor to Westinghouse-Bremsen-Gesellschaft m.b.H., Hannover, Germany
Filed Dec. 12, 1961, Ser. No. 158,846
Claims priority, application Germany, Dec. 29, 1960, W 29,179
5 Claims. (Cl. 200—61.45)

This invention relates to combination wheel-spin and wheel-slide control apparatus and, more specifically, to such apparatus responsive to both angular acceleration of the vehicle wheels and linear acceleration of the vehicle, as related to each other, for preventing both wheel-spin and wheel-slide.

Some of the conventionally known control apparatus of the above-described type include, as a control member, either an inertia wheel disc, which responds to angular acceleration or deceleration of a wheel, or a centrifugally responsive weight with associated mechanism characterized by a timing operation. These conventionally known apparatus do not perform with complete satisfaction since the sensitivity of said apparatus is such that untimely or undesirable functioning of the apparatus may occur during maximum acceleration or deceleration of the vehicle without actual accompaniment of wheel-spin or wheel-slide.

Other known control apparatus for preventing wheel-spin and wheel-slide operate responsively to relative movement between an inertia wheel and a vehicle wheel as contrasted to relative movement between a second inertia mass and the linear movement of the vehicle. With control apparatus of this type, however, it is necessary that pole reversing switches be included in the system in order to prevent undesirable electrical current flow and, therefore, untimely operation of the wheel-spin and wheel-slide control apparatus due to untimely switch operation resulting from further acceleration of the wheel following a wheel-spin or wheel-slide correcting operation of the apparatus.

Moreover, control apparatus of the type immediately above described necessitate complex and expensive structure which inherently does not insure against trouble-free operation and therefore costly repairs.

The object of this invention is to provide a combined wheel-spin and wheel-slide control apparatus characterized by its simplicity of structure, low cost of production and trouble-free operation. This object is realized by providing a control apparatus or device having a rotary inertia mass responsive to angular acceleration of the vehicle wheel to be protected and a slidable inertia mass responsive to linear acceleration of the vehicle. Any relative angular displacement between the rotary inertia mass and the vehicle wheel, and any relative linear displacement between the slidable inertia mass and the vehicle is translated into axial movement of control members aligned on a common axis, one of said control members being an electrical switch device having a switch member which is influenced by any discrepancy between angular displacement and linear displacement for effecting appropriate operation of associated control apparatus to prevent either wheel-spin or wheel-slide, as the case may be. If angular displacement corresponds to linear displacement, the entire switch device is correspondingly moved axially to prevent operation of the switch member. The control device embodying the invention operates as described whether wheel-spin or wheel-slip occurs or whether the vehicle is moving in a forward or reverse direction.

More specifically, the switch device is fixed to an axially movable shaft having rollers carried thereby which ride on parallel cam surfaces formed on the slidable inertia mass, said shaft, rollers and switch device being spring-biased toward a normal position in which said rollers are disposed on the respective low points of the cam surfaces, said low points lying in a plane passing through the axis of said shaft. The rotary inertia mass also has formed thereon parallel cam surfaces in which a pair of respective rollers are adapted to ride for effecting axial movement of a switch stem axially aligned with the shaft carrying the switch device. Angular displacement of the rotary inertia mass causes axial movement, through the cam arrangement, of the switch stem, which is engageable with the switch member of the switch device. By this design, whether a wheel-spin or wheel-slide producing condition prevails, or whether the vehicle is moving forward or in reverse, the switch member of the switch device remains unaffected, when angular acceleration corresponds with linear acceleration, because the switch stem controlled by the rotary inertia mass and the shaft carrying the switch device are both caused to move an equal amount in the same axial direction by displacement of the respective inertia masses, thus producing no switch action.

Additionally, because of the arrangement of the cam surfaces on the respective inertia masses, should relative displacement occur between said inertia masses, such as when the vehicle is negotiating a hill (which would cause displacement of the slidable inertia mass) or when a railway car is coupled to a standing car (the shock of which would cause displacement of the slidable inertia mass), no switching action would result, because the switch device would be moved away from the switch stem by the displacement of the slidable inertia mass, while said switch stem would remain in its normal axial position due to no angular displacement of the rotary inertia mass. Consequently, only during the occurrence of wheel-spin and wheel-slide, which produce a differential in relative displacement between the two inertia masses, can there be a switch actuation.

Figure 2:
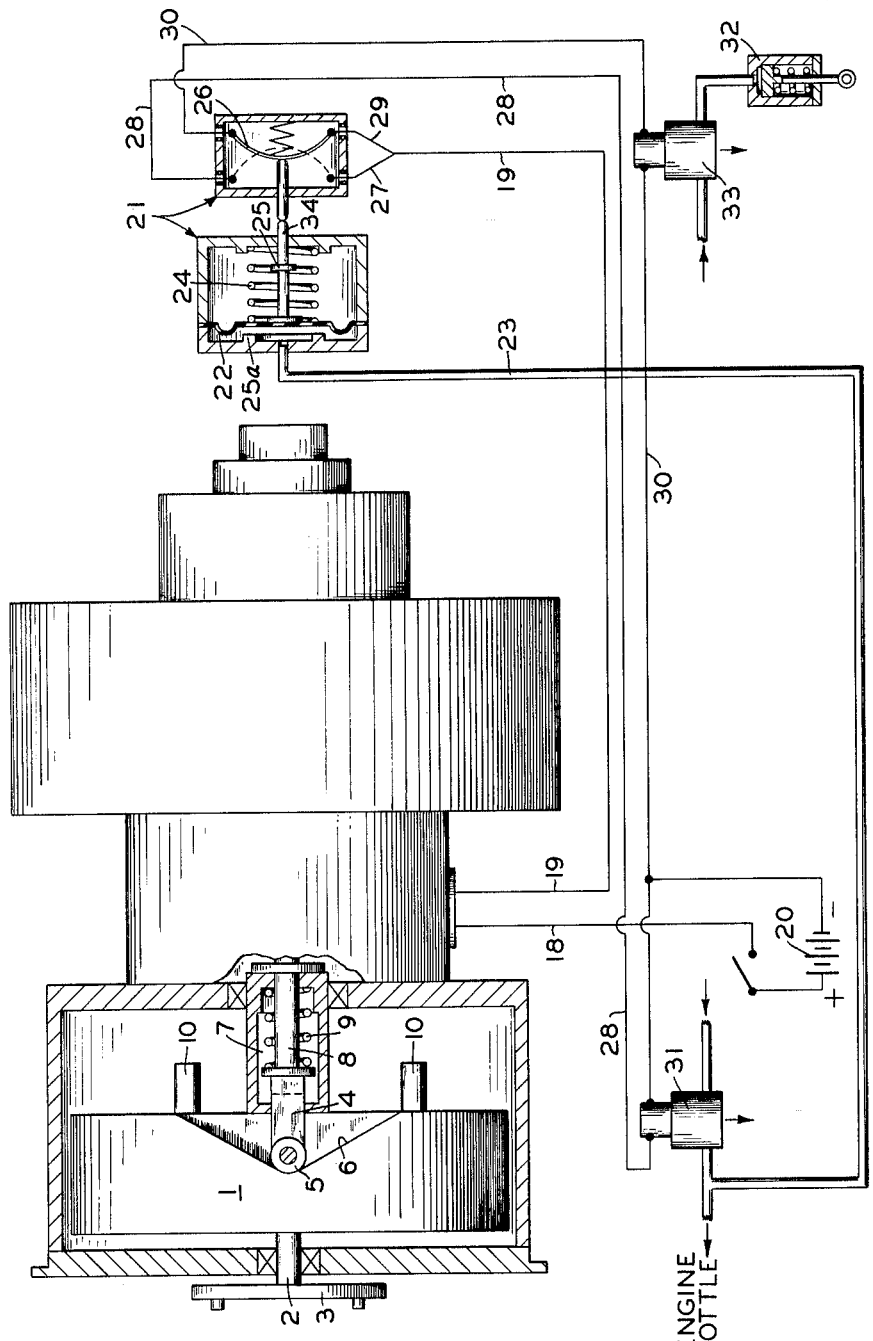

Accordingly, a typical design for carrying out the objects of the invention is shown in the accompanying drawings in which:

FIG. 1 is a sectional view, on a horizontal plane, of a control device for preventing wheel-spin and wheel-slide; and FIG. 2 is a schematic view showing the control device partly cut away and associated control circuits and valve devices.

*Description and operation*

As shown in FIG. 1, the combined wheel-spin and wheel-slide control device comprises a rotary inertia mass or flywheel 1 driven through a shaft 2 coupled to a vehicle wheel axle (not shown) by a drive plate 3. The shaft 2, in turn, drives a spring-biased yoke-like lever 4 having a roller or cam follower 5 at each end. The rollers 5 ride in respective parallel cam cavities or surfaces 6 formed adjacent the periphery of the flywheel 1 at diametrally opposite locations and are arranged in such manner that any angular displacement of said flywheel relative to the shaft 2, resulting either from wheel-spin or wheel-slip, causes said rollers to ride up on the cam surfaces 6.

The yoke-like lever 4 passes transversely to the shaft 2 through a recess 7 formed diametrally in the shaft 2 and has affixed thereto a stem 8 extending, coaxially with the shaft, through said recess and terminating beyond the end of said shaft opposite the drive plate 3. Movement of the rollers 5 up the inclined faces of cam surfaces 6 results in axial movement of the stem 8 against the biasing action of a spring 9, which acts to bias the yoke-like lever 4 toward the flywheel 1 and, therefore, the rollers 5 into the low points of said cam surfaces. This relationship may best be seen in the cut-away portion of the control device in FIG. 2. Stops 10 are provided on the flywheel 1 to define the limits of relative angular displacement between said flywheel and the shaft 2.

Since the cam surfaces are inclined in both directions (see FIG. 2) from the low point, any relative angular movement, either in a clockwise direction or a counter-clockwise direction, between the flywheel 1 and the yoke-like lever 4 causes axial movement of the stem 8 in the same axial direction (toward the right hand, as viewed in the drawings). It is immaterial, therefore, whether the flywheel 1 is displaced relatively to the shaft 2 either as a result of wheel-spin or wheel-slide provocation, or whether the vehicle is moving in a forward or reverse direction.

The control device, as shown in FIG. 1, further comprises a slidable or linear inertia mass 11 which is capable of limited linear displacement relative to the vehicle and in a direction corresponding with the linear direction of travel of the vehicle, both forward and reverse. The linear inertia mass 11 is provided with a plurality of rollers 11a having rolling contact with a pair of oppositely aligned guide bars 11b on which said inertia mass is supported and is slidably movable in a linear direction corresponding to the linear direction of travel of the vehicle, either forward or reverse. The linear inertia mass 11 is provided with a centrally disposed recess, the cross section of which is essentially rectangular in form and through which a shaft 12 extends, said shaft being axially aligned with stem 8 and shaft 2. The central recess formed in linear inertia mass 11 is long enough to permit linear movement of said inertia mass unobstructedly without making contact with the shaft 12. The shaft 12 is also provided with a pair of rollers or cam followers 13 which are adapted to ride in respective parallel cam surfaces 14 formed in the linear inertia mass on opposite sides of the central recess. The rollers 13 are so arranged with the cam surfaces 14 that any linear displacement of the linear inertia mass 11, in either a forward or reverse direction relative to the direction of travel of the vehicle, causes said rollers to ride up respective inclined portions of said cam surfaces and thereby effect axial movement of the shaft 12 in the same axial direction as that of stem 8 when effected by relative displacement of flywheel 1, that is, in the direction of the right hand as viewed in the drawing.

An electrical switch device 15 is fixed to one end of shaft 12 and is interposed between said shaft and the adjacent free end of stem 8. A spring 16 encircling the other end of shaft 12 biases said shaft, with the switch device 15, toward stem 8 and also biases the rollers 13 toward the low point of the cam surfaces 14. The stem 8 is adapted to operate the switch device 15 in a manner to be hereinafter explained. Stops 17 are provided at opposite sides of the linear inertia mass for limiting relative displacement thereof and thereby preventing the rollers 13 from riding out of the cam surfaces 14. Since the cam surfaces 14 are inclined in both directions from the low point, any linear displacement of the linear inertia mass 11, in either a forward or reverse direction relative to the direction of travel of the vehicle, or whether caused by excessive acceleration or deceleration of the vehicle, causes axial movement of shaft 12, in each instance, in the same axial direction above mentioned.

The switch device 15 comprises two terminals connected respectively to two electrical conductors 18 and 19, said conductor 18 being connected to the positive side of a source of electrical power such as a battery 20, while said conductor 19 is connected to a magnet valve device (not shown) which, in turn, is connected by a conductor (not shown) either to ground or to the negative side of the battery, thereby constituting a control circuit, the purpose of which will be subsequently disclosed.

In considering the operation of the invention, as disclosed in FIG. 1 of the drawings, it may be assumed that the vehicle is moving in the direction indicated by the arrow D in FIG. 1, so that either acceleration or deceleration of the vehicle causes angular displacement of the flywheel 1 either in a clockwise or a counterclockwise direction, respectively, relative to the vehicle wheel, as viewed from the left-hand side of the drawing, to thereby cause axial movement of lever 4 and stem 8 toward the right, as above described. Such action, assuming the switch device 15 remained in a stationary position, would permit the stem 8 to operate a switch member in said switch device from an open position (indicated by the solid curved line in the drawing), in which conductors 18 and 19 are disconnected, to a closed position (indicated by the broken curved line in the drawing), in which conductors 18 and 19 are connected to close the control circuit. Simultaneously, however, due to acceleration or deceleration of the vehicle, as the case may be, linear displacement of the inertia mass 11 also occurs to cause the shaft 12 and, therefore, the switch device 15 to be shifted toward the right, as above described. Thus, when wheel acceleration or deceleration occurs corresponding in rate to vehicle acceleration or deceleration, lever 4, stem 8, shaft 12 and switch device 15 all are shifted in the same axial direction an equal amount, and, therefore, no actuation of the switch device 15 to its closed position is effected, since there is no relative axial movement between the stem 8 and said switch device. This arrangement thereby insures against untimely energization of the control circuit during acceleration or deceleration when there is no spinning or sliding of the vehicle wheel.

If, however, a differential in rate of either acceleration or deceleration, as the case may be, occurs between the vehicle wheel and the vehicle due to prevailing conditions causing either wheel-spin or wheel-slide, the angular displacement of the flywheel 1 relative to the vehicle wheel is relatively greater than linear displacement of the inertia mass 11, whereby axial movement of the stem 8 is greater than axial movement of the switch device 15. The switch device 15 is thus actuated to its closed position to close the control circuit, comprising the conductors 18 and 19, to effect the desired control operation for correcting the wheel-spin or wheel-slide condition, as the case may be.

On the other hand, if relative displacement of the inertia mass 11 only occurs, such as when the vehicle is moving up-grade or down-grade or as might result from impact when one vehicle is coupled to another, so that relative axial movement occurs between the shaft 12 and the stem 8, no actuation of the switch device 15 to its closed position is effected, because, as above noted, the axial movement of the shaft 12 and, therefore, of said switch device is toward the right and in this case away from stem 8, which remains stationary since no angular displacement of the flywheel 1 occurs.

FIG. 2 schematically illustrates control apparatus which may be used with the control device, shown in FIG. 1, for carrying out the purpose of the invention. The arrangement, as shown in FIG. 2, makes it possible to use the control device shown in FIG. 1 (and shown mostly in outline in FIG. 2) with the associated equipment, as shown in FIG. 2, to protect the wheel against both wheel-spin and wheel-slide. To accomplish the purpose of the invention, a selector switch device 21 is provided and comprises a switch device similar to the switch device 15, but is controlled by means of a diaphragm 22 which is subjected on one side to pressure of fluid from a conductor 23, which supplies control pressure to an engine throttle (not shown), and on the other side to an opposing biasing force of a spring 24. Stops 25 and 25a limit travel of the diaphragm in respective opposite directions. A switch member 26 is actuable to either a wheel-slide position (shown in curved broken line in the drawing), in which an electrical conductor 27 is connected with an electrical conductor 28, or to a wheel-spin position (shown in solid curved line in the drawing), in which an electrical conductor 29 is connected with an electrical conductor 30. Conductors 27 and 29 are actually branches of conductor 19.

Conductors 27 and 28, along with conductors 18 and 19, the switch device 15 and battery 20, comprise a control circuit for a magnet valve device 31, which, when energized, cuts engine throttle control pressure to a low degree for effecting idling speed of the engine and at the same time, via a pressure fluid conduit not shown, effects the supply of a light degree of fluid pressure to a brake cylinder device 32 for applying a light braking force to the vehicle wheel for terminating or correcting wheel-spin during propulsion.

Conductors 29 and 30, along with conductors 18 and 19, the switch device 15 and battery 20, comprise a control circuit for a magnet valve device 33 which, when energized, either reduces or completely exhausts fluid pressure in the brake cylinder device 32 for correcting wheel-slide causing conditions when a brake application is in effect on the vehicle wheel. When the magnet valve device 33 is deenergized upon termination of the wheel-slide condition, supply of brake-applying fluid pressure is re-established to the brake cylinder device 32.

In considering the operation of the control apparatus shown in FIG. 2, let it be assumed the vehicle operator has effected a brake application on the vehicle. When a brake application is effected, conduit 23 is caused to be vented (in a manner not considered essential to an understanding of the invention and, therefore, not illustrated) to reduce the vehicle engine to idling speed as well as reduce fluid pressure acting on diaphragm 22 of the selector switch device 21. Spring 24 causes the diaphragm 22 as well as a stem 34 coaxially associated therewith to be shifted in a left-hand direction, as viewed in the drawing, to permit the switch member 26 to move to its wheel-slide position whereby the magnet valve device 33 may be energized if wheel-slide causing conditions prevail and cause the switch device 15 to be actuated to its closed position. Should the switch device 15 be actuated to its closed position, as above described, in response to a wheel-slide situation, the control circuit for energizing the magnet valve device 33 is thus completed and reduction or complete release of the brake application is momentarily effected to permit recovery of the wheel to normal rotation.

When fluid pressure in conduit 23 is reestablished to normal throttle supply, such pressure acting on diaphragm 22 will cause said diaphragm and the stem 34 to move in a right-hand direction and cause the switch member 26 to be operated to its wheel-spin position in which magnet valve device 31 may be energized, if wheel-spin occurs, to cause the switch device 15 to be actuated to its closed position. Should wheel-spin occur and cause the valve device 15 to be operated to its closed position, as above described, the control circuit for energizing the magnet valve device 31 is thus closed and a light brake application is effected on the spinning wheel, as above described, when said magnet valve device is energized.

Having now described the invention, what I claim as new and desire to secure by Letters Patent is:

1. Combined wheel-spin and wheel-slide control apparatus for preventing spinning or sliding of a vehicle wheel during application of propulsion power or braking force, respectively, to the wheel, said control apparatus comprising the combination of:
   (a) a shaft adapted to be connected to and rotated according to the rotation of the vehicle wheel,
   (b) a rotary inertia mass rotatably supported on said shaft,
   (c) first cam means through which said rotary inertia mass is driven by said shaft and angular displacement of said rotary inertia mass out of a certain rotational position relative to said shaft occurs in response to angular acceleration or deceleration of said shaft,
   (d) a second inertia mass supported on the vehicle and having linear displacement relative thereto in response to linear acceleration or deceleration of the vehicle,
   (e) a switch-operating stem movable in a certain axial direction by said first cam means responsively to angular displacement of said rotary inertia mass relative to said shaft due to acceleration or deceleration of said shaft,
   (f) a switch-carrying member,
   (g) second cam means through which axial movement of said switch-carrying member in a direction corresponding to said certain axial direction is effected responsively to linear displacement of said second inertia mass out of a certain linear position relative to the vehicle due to acceleration or deceleration of the vehicle, and
   (h) an electrical switch device carried by said switch-carrying member and having one operative position and another operative position,
   (i) said switch-operating stem and said switch-carrying member cooperating so long as they occupy a certain axial relation to cause said electrical switch device to be in said one operative position and being effective upon movement thereof out of said certain axial relation to cause operation of said electrical switch device to said another operative position.

2. The combination, as defined in claim 1, wherein:
   (a) said first cam means and said second cam means are each characterized by V-shaped cam surfaces on said rotary inertia mass and said second inertia mass, respectively, and respective follower means cooperative with the respective cam surfaces for effecting said axial movement of said switch-operating stem and said switch-carrying member, respectively,
   (b) said switch-operating stem and said switch-carrying member being coaxially disposed for concurrent movement thereof in said certain axial direction and for concurrent return axial movement thereof in a same but opposite direction to said certain axial direction following operation of said electrical switch device to its said another operative position, said return movement of said switch-carrying member being limited to a certain lesser amount than that of said switch-operating stem so as to effect restoration thereof to said certain axial relation, and
   (c) said cam surface of said second cam means cooperating with said follower means of said second cam means for causing said switch-carrying member and therefore said electrical switch device to be moved axially away from the switch-operating stem for preventing untimely operation of said electrical switch device to its said another operative position as a result of impact during coupling of one vehicle to another.

3. The combination, as defined in claim 2, wherein said second inertia mass is disposed transversely to said switch-carrying member, said follower means of said second inertia mass comprising rollers carried by the switch-carrying member and a biasing spring for biasing said switch-carrying member and, therefore, said rollers toward respective low points formed on said cam surface of said second inertia mass, said follower means of said second cam means cooperating with said cam surface of said second cam means for effecting axial movement of said switch-carrying member in both said certain axial direction and said direction opposite to said certain direction upon linear displacement of said second inertia mass relative to the vehicle.

4. The combination defined in claim 3, further characterized by respective stop means for limiting angular displacement of said rotary inertia mass relative to said shaft and linear displacement of said second inertia mass relative to the vehicle.

5. The combination defined in claim 4, further characterized in that the follower means of said first cam means comprises a yoke-like lever having rollers which ride in the respective cam surfaces formed on said rotary inertia mass, said lever being drivingly connected to said rotatable shaft and constituting a flexible driving medium between said shaft and said rotary inertia mass, and spring means for biasing said lever and therefore said last-named rollers toward respective low points formed on said last-mentioned cam surfaces.

References Cited by the Examiner

UNITED STATES PATENTS

| | | | |
|---|---|---|---|
| 2,034,745 | 3/1936 | Cummins | 105—48 |
| 2,321,059 | 6/1943 | Anderson | 192—3 |
| 2,907,607 | 10/1959 | Williams | 188—181 |
| 2,913,072 | 11/1959 | Williams | 188—181 |
| 2,920,924 | 1/1960 | Reswick et al. | 303—24 |
| 2,933,161 | 4/1960 | Hebberling et al. | 188—181 |

BERNARD A. GILHEANY, *Primary Examiner.*

LEE QUACKENBUSH, *Examiner.*